United States Patent [19]

Choi

[11] Patent Number: 5,126,893
[45] Date of Patent: Jun. 30, 1992

[54] DIGITAL SIGNAL REPRODUCING CIRCUIT

[75] Inventor: Young-jun Choi, Kyunggi-do, Rep. of Korea

[73] Assignee: Samsung Electronics Co., Ltd., Rep. of Korea

[21] Appl. No.: 636,730

[22] Filed: Dec. 27, 1990

[30] Foreign Application Priority Data

Dec. 27, 1989 [KR] Rep. of Korea ............... 89-19697

[51] Int. Cl.⁵ .............................................. G11B 15/14
[52] U.S. Cl. ..................................................... 360/67
[58] Field of Search .......................... 360/67, 65, 46

Primary Examiner—Vincent P. Canney
Attorney, Agent, or Firm—Leydig, Voit & Mayer

[57] ABSTRACT

The present invention discloses a circuit for reproducing a digital signal which is recorded on a recording medium with high density. The reproducing circuit of the present invention adds an output obtained by differentially amplifying the signal, picked up with a playback head, with respect to a predetermined reference voltage, an amplified output delayed by a predetermined time 1T and a different amplified output delayed by 2T, thereby widening the pulse width of the reproduced waveform to be equalized. Accordingly, even a feeble isolated pulse of high density can be exactly reproduced, and the deterioration of the reproducing picture quality or the sound quality can be prevented.

4 Claims, 3 Drawing Sheets

DIGITAL SIGNAL REPRODUCING CIRCUIT

FIELD OF THE INVENTION

The present invention relates to a digital signal reproducing circuit, and more particularly to a digital signal reproducing circuit which can reproduce digital data recorded on a recording medium in high density.

BACKGROUND OF THE INVENTION

Recently, according to the development of the recording medium, a recording medium having record density of above tens Mbps has appeared. But a conventional reproducing apparatus using a magnetic head does not function very well for a high frequency signal, for instance, above 10 MHz. In particular, according to the development of the digital techniques, such as the digital audio tape, a digital VTR, etc., the required recording density of data is highly increased, but the recording density, for instance, above 20 Mbps can not be achieved because of the limitation of the above-described reproducing apparatus. Moreover, under such high recording density, when the recorded data is an NRZ (non-return-to-zero) type isolated pulse, it is not possible for the reproducing apparatus to exactly reproduce the record data, so that the deterioration of the reproduced sound quality or the reproduced picture quality is caused.

Conventionally, for instance, a reproducing equalizer such as U.S. Pat. No. 4,714,958 shown in FIG. 1 is used to improve the quality of a reproduced signal. The reproducing equalizer, which is composed of a video processor, divides a composite video signal received in an input terminal 1. The divided signals are respectively amplified in amplifiers 2 and 3, and one of amplified signals is delayed by a predetermined time in a phase shifter 4 to be mixed with the other signal in a mixer 5, thereby improving reproduced picture quality.

Though the above described reproducing equalizer is efficient in a standard NTSC type TV or a reproducing apparatus, when the reproducing equalizer is used for a recording medium having high recording density of tens Mbps as described above, there arise problems such that the complete equalization of the reproduced waveform is impossible and the reproduced picture quality or the sound quality is deteriorated.

SUMMARY OF THE INVENTION

Accordingly, it is an object of the present invention to provide a reproducing circuit which can reproduce a feeble digital signal of high recording density, in order to solve the above problems.

It is another object of the present invention to provide a digital signal reproducing circuit which not only continuously processes a feeble digital signal of high recording density, but is also flexibly adapted to the frequency characteristic of a processing signal.

To achieve the above objects, a digital signal reproducing circuit according to the present invention comprises:

a playback amplifier for amplifying a digital signal which is picked up from a recording medium by a playback head;

first delay means for delaying an output signal of the playback amplifier by a predetermined period;

first differential amplifying means for differentially amplifying the output signal of the playback amplifier with respect to a predetermined reference voltage;

second delay means for delaying the output signal of the first delay means by a predetermined time again;

an amplifier for amplifying the output signal of the first delay means;

second differential amplifying means for differentially amplifying the output signal of the second delay means with respect to the reference voltage; and a contact point for adding the outputs of the first differential amplifying means, the amplifier, and the second differential amplifying means, and generating an added output.

According to the structure, the present invention provides the digital signal reproducing circuit which reproduces the digital signal of high recording density, for instance, such as 20 Mbps to 40 Mbps having frequencies of 10 MHz to 20 MHz.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

Figure 1:
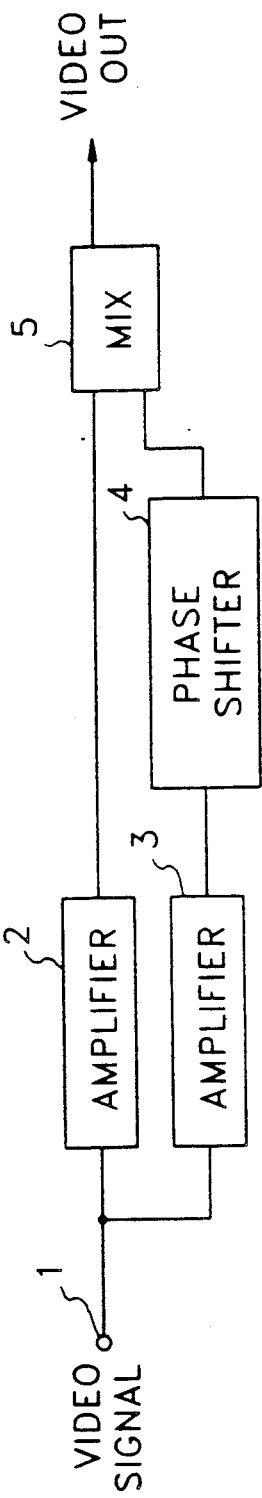
FIG. 1 is a block diagram showing a conventional digital signal reproducing circuit.
Figure 2:
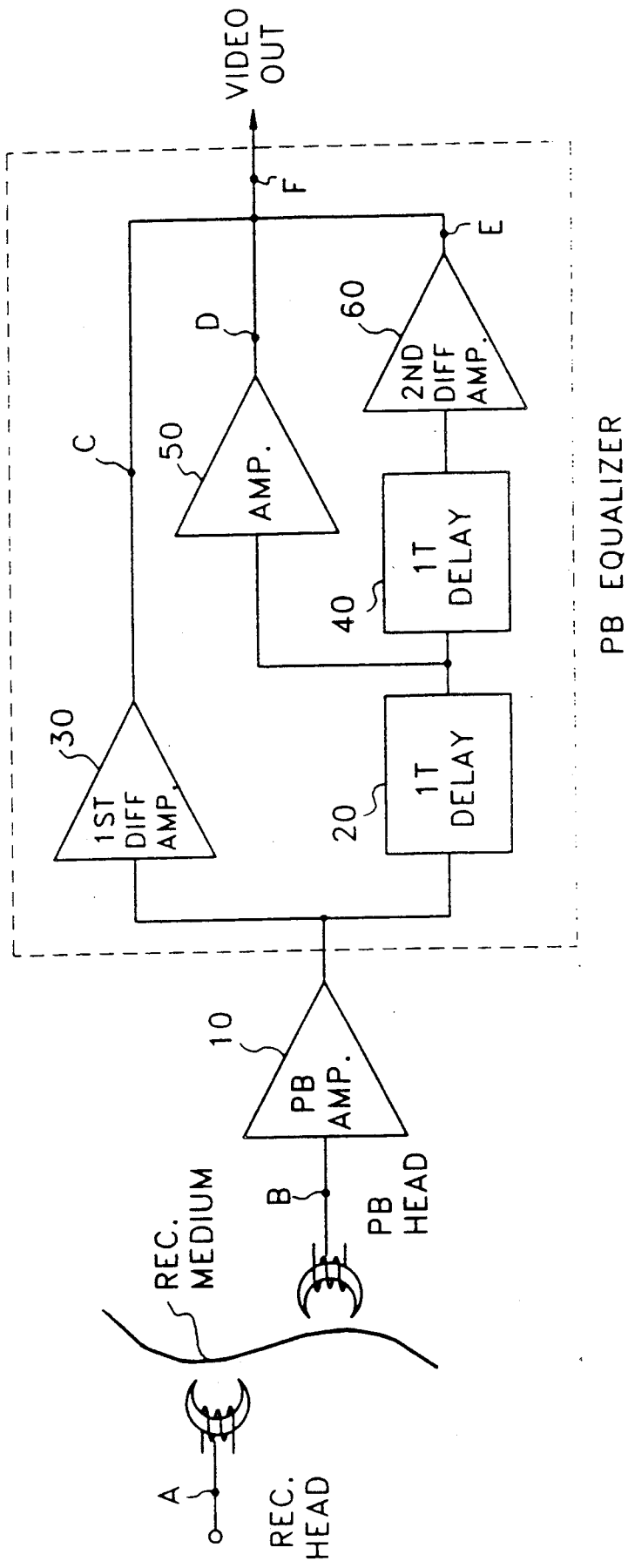
FIG. 2 is a block diagram showing a digital signal reproducing circuit according to the present invention.

In FIG. 2, a digital signal, which has been recorded on a recording medium by a record head, is picked-up by a playback head. Since the signal is a feeble signal, the picked-up signal is amplified in a playback amplifier 10 and is then supplied to a playback equalizer at the succeeding stage. The output signals of the playback amplifier 10 supplied to the equalizer are branched into a first differential amplifying means 30 and a first delay means 20. The signal received in the first differential amplifying means 30 is compared with a predetermined reference voltage to be differentially amplified, and the signal received in the first delay means 20 is delayed by a predetermined time 1T and then output. The predetermined time 1T is a value which is properly determined according to the signal delay characteristic of the reproducing circuit of the present invention. The 1T delayed signal is again branched into a second delay means 40 and an amplifier 50. After the signal fed to the second delay means 40 is again delayed by 1T, the delayed signal is fed to a second differential amplifying means 60 to be differentially amplified and is output. The output of the second differential amplifier 60 is added to the outputs of the first differential amplifying means 30 and the amplifier 50 and the added output is produced.

The operation of the present circuit having the above structure is explained with reference to FIG. 2 and FIG. 3 as follows.

Figure 3:
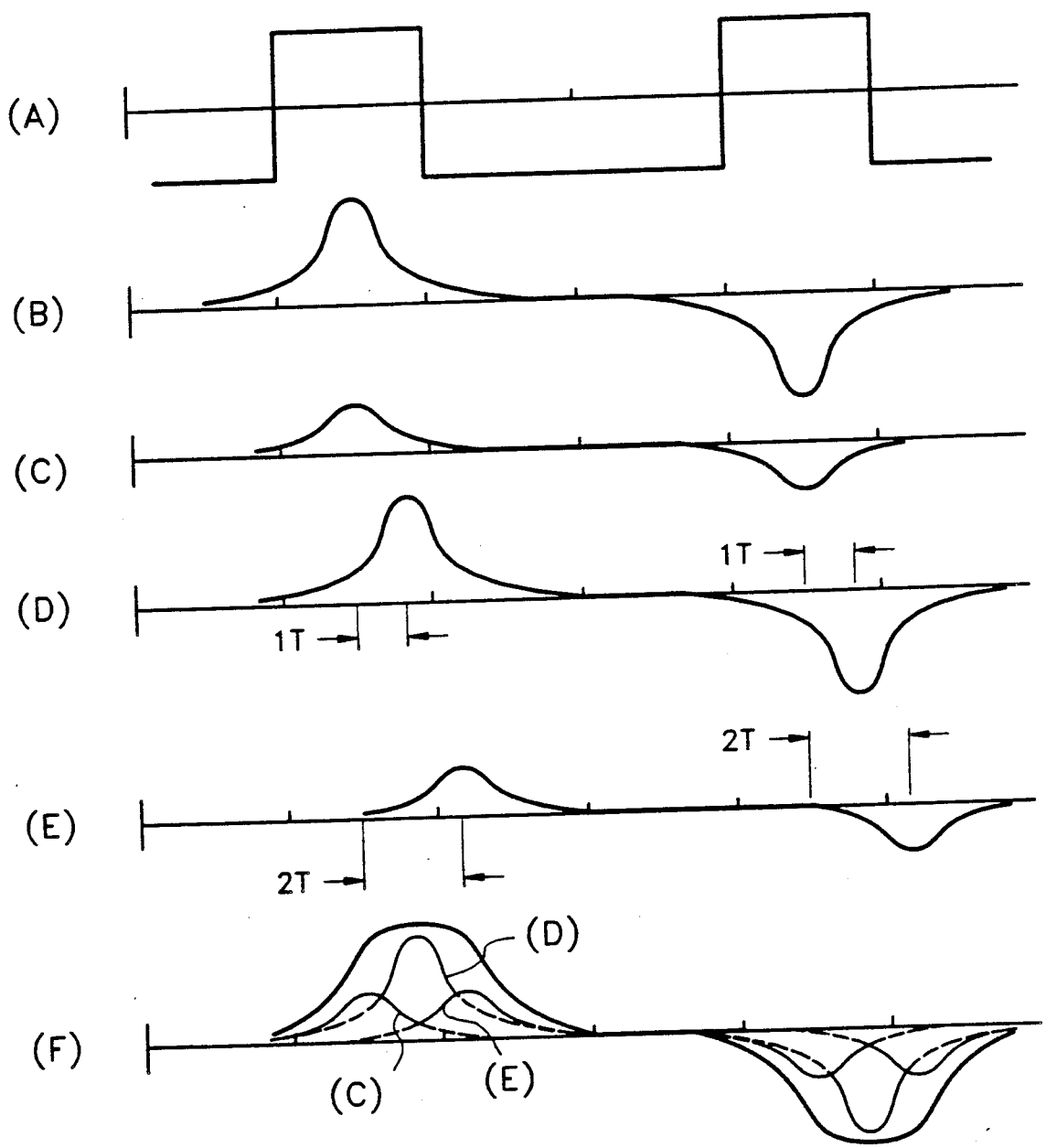
FIGS. 3A through F is a waveform chart showing signals in each parts of the reproducing circuit shown in FIG. 2.

The NRZ type digital signal, which is recorded such as a waveform shown in (A) of FIG. 3, is picked up into a waveform shown in (B) of FIG. 3 in the playback head, and is amplified in the playback amplifier 10. The signal received in the first differential amplifying means 30 is compared with the reference voltage, and is amplified to such a waveform shown in (C) of FIG. 3 by the difference. The signal received in the first delay means 20 is delayed by 1T, and is amplified in the amplifier 50, thereby supplying a 1T delayed signal as shown in (D) of FIG. 3. On the other hand, the output of the first delay means 20 received in the second delay means 40 is again delayed by 1T, and is fed to the second differential amplifying means 60 to be differentially amplified, thereby being supplied as a 2T delayed signal as shown in (E) of FIG. 3.

The signals (C), (D), and (E) of FIG. 3 are added at a contact point, and the added output is supplied with a waveform (F) shown in FIG. 3 to the succeeding video circuit, in which the pulse width widens to have a nearly flat top portion, thereby being equalized similarly to the recorded signal.

The equalized output signal (F) shown in FIG. 3 is produced with a certain time delay with respect to the recorded signal (A) shown in FIG. 3, the time delay will be properly compensated in succeeding circuits.

Figure 4:
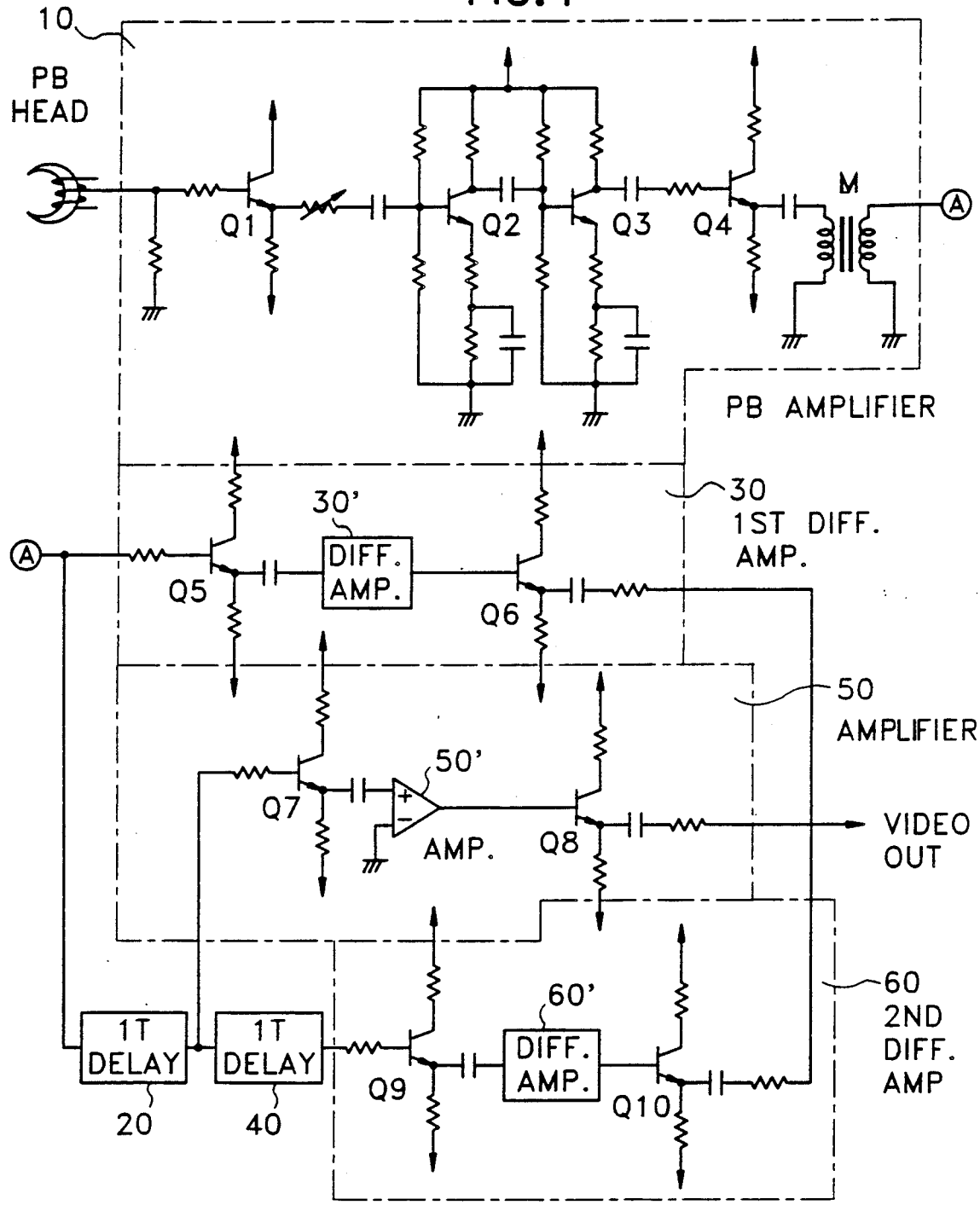
FIG. 4 is a circuit diagram of a preferred embodiment of the reproducing circuit shown in FIG. 2.

FIG. 4 is a circuit diagram of an embodiment of the digital signal reproducing circuit.

In the drawing, the reproducing signal picked up by a playback head is fed to a playback amplifier 10. In the playback amplifier 10, transistor Q1 and its peripheral elements constitute an input buffer, and transistors Q2 and Q3 and their peripheral elements constitute a multi-step amplifier. On the other hand, a transistor Q4 and its peripheral elements become an output buffer, and a transformer M matches the impedance with the succeeding circuits.

The signal supplied from the playback amplifier 10 is supplied to the first delay means 20 and the first differential amplifying means 30. In the first differential amplifying means 30, transistors Q5 and Q6 before and after a differential amplifier 30', and their peripheral elements serve as input/output buffers, respectively, and the transistor Q6 carries out the impedance matching with the succeeding circuit.

The signal delayed by 1T in the first delay means 20 is fed to the second delay means 40 and the amplifying means 50. In the amplifying means 50, the transistors Q7 and Q8 before and after an amplifier 50', and their peripheral elements are input/output buffers.

The signal delayed by 1T again in the second delay means 40 is fed to the second differential amplifying means 60, where the transistors Q9 and Q10 at the preceding and succeeding stages of a differential amplifier 60' and their peripheral elements are input/output buffers.

In the above-described preferred embodiment, the only difference is the arrangement of buffers and circuitry for the impedance matching, and the fundamental operation is almost same, so that the additional explanation will be omitted.

As described above, according to the present invention, a signal with high recording density recorded on the recording medium is reproduced as a feeble signal, and is equalized to have a pulse width which is almost equal to the original signal, thereby being exactly reproduced. In particular, even an NRZ type isolated pulse can be completely reproduced and equalized, thereby preventing the deterioration of the reproduced picture quality or the sound quality, so that the present invention can be widely used in the field of the digital medium apparatus of high recording density.

What is claimed is:

1. A digital signal reproducing circuit comprising:
   a playback amplifier for amplifying a digital signal, which is picked up from a recording medium by a playback head;
   first delay means for delaying an output signal of said playback amplifier by a predetermined period;
   first differential amplifying means for differentially amplifying an output signal of said playback amplifier with respect to a predetermined reference voltage;
   second delay means for delaying the output signal of said first delay means by a predetermined time;
   means for amplifying the output signal of said first delay;
   second differential amplifying means for differentially amplifying the output signal of said second delay means with respect to said reference voltage; and
   a contact point for adding the outputs of said first differential amplifying means, said amplifying means, and said second differential amplifying means.

2. A digital signal reproducing circuit as in claim 1 where said playback amplifier includes input and output buffers.

3. A digital signal reproducing circuit as in claim 1 where said playback amplifier includes a multi-step amplifier.

4. A digital signal reproducing circuit as in claim 1 where said playback amplifier includes a transformer for impedance matching.

* * * * *